May 21, 1946.  G. L. MORRISON  2,400,567
METHOD OF AND MEANS FOR CALCULATING AND
CONTROLLING LINE PRINTING MACHINES
Filed March 30, 1942   8 Sheets-Sheet 1
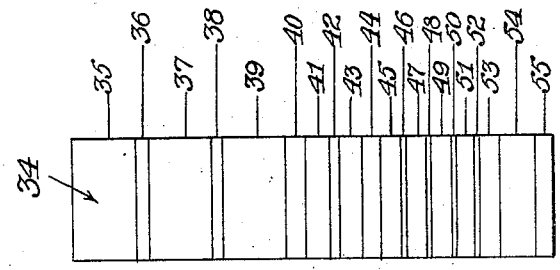
Inventor:
George L. Morrison,
By Critton, Wiles, Davies & Hirschl,
Attys

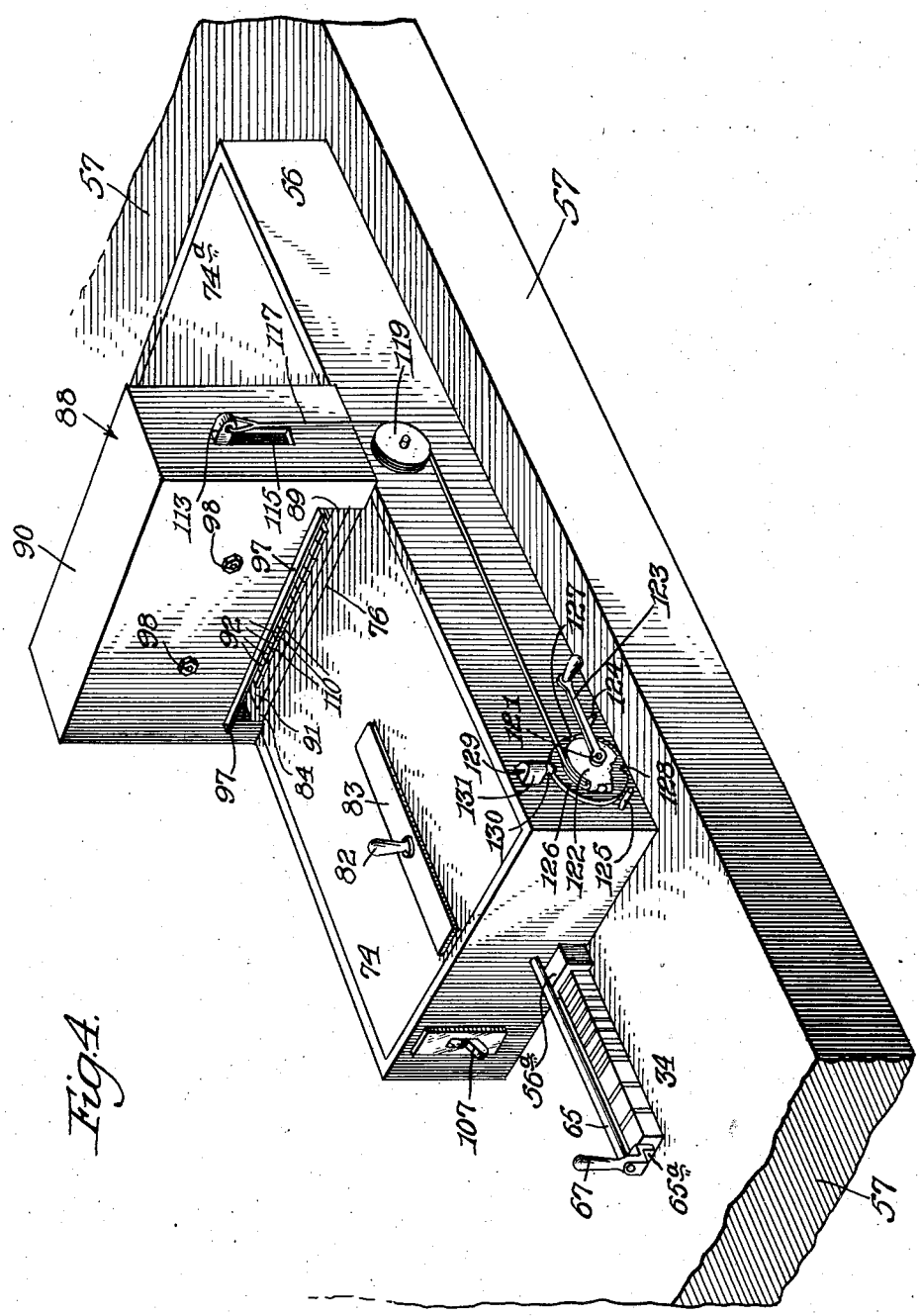

May 21, 1946.　　　G. L. MORRISON　　　2,400,567
METHOD OF AND MEANS FOR CALCULATING AND
CONTROLLING LINE PRINTING MACHINES
Filed March 30, 1942　　　8 Sheets-Sheet 3
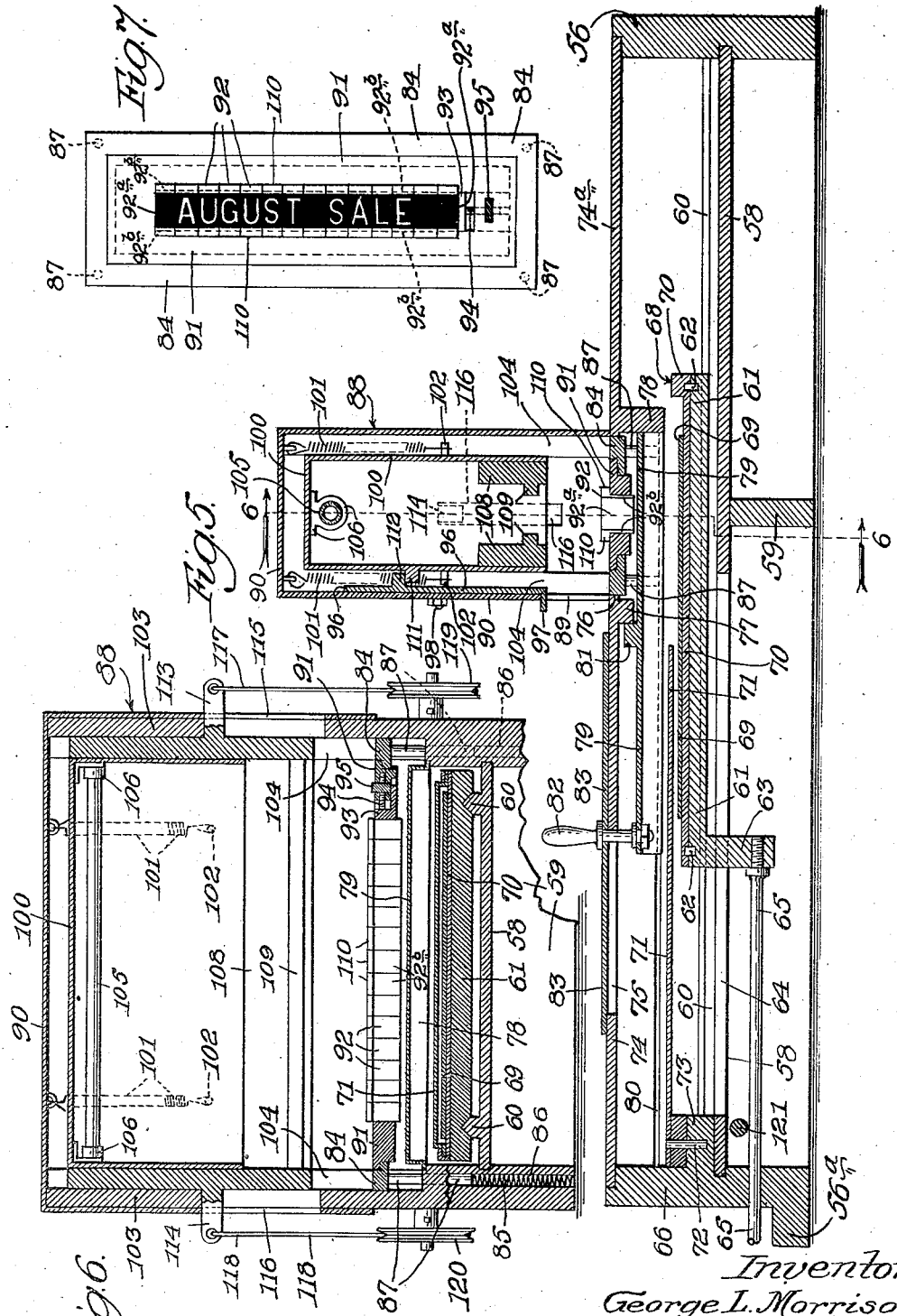

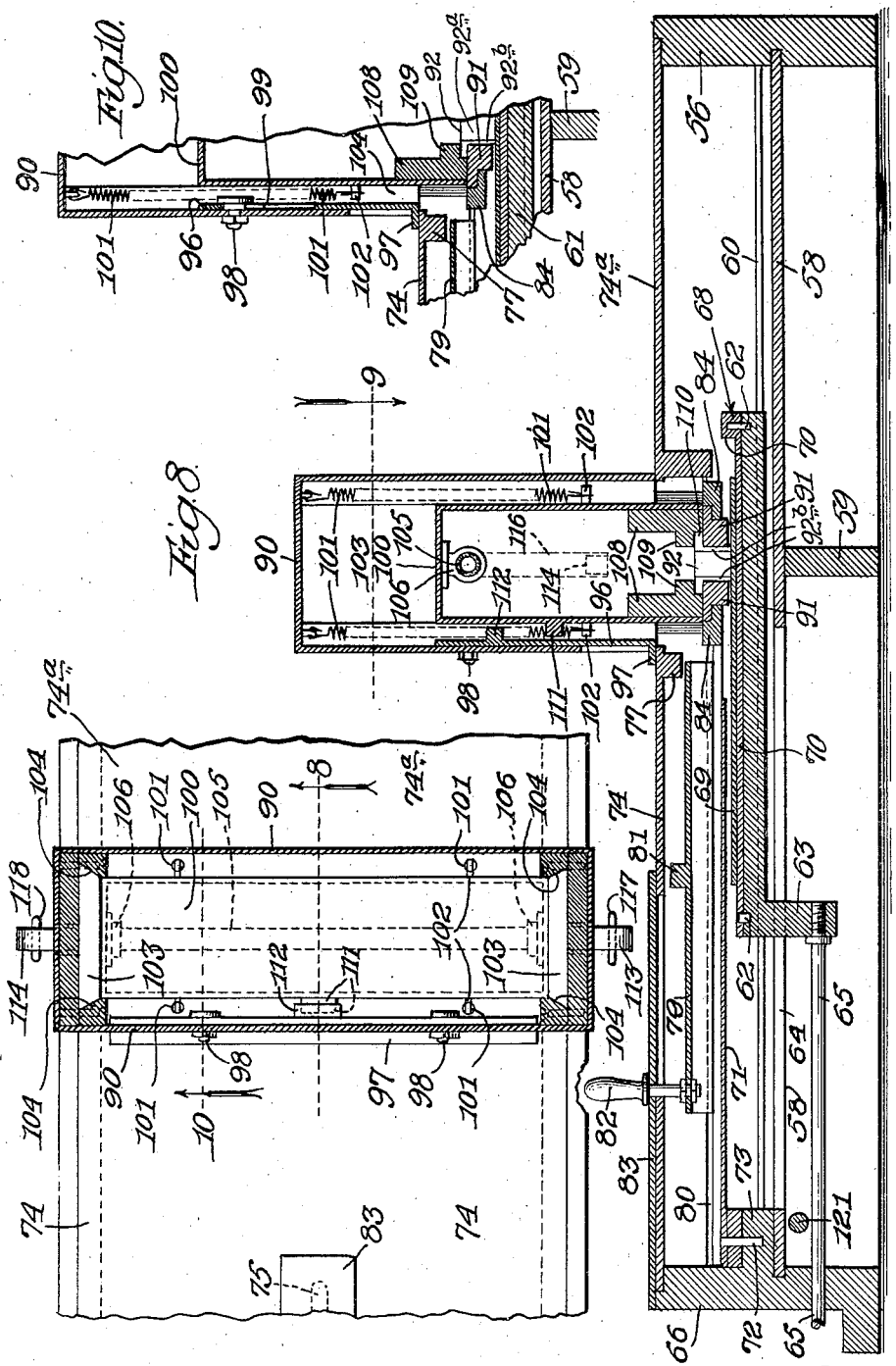

May 21, 1946.          G. L. MORRISON          2,400,567
         METHOD OF AND MEANS FOR CALCULATING AND
             CONTROLLING LINE PRINTING MACHINES
                  Filed March 30, 1942          8 Sheets-Sheet 5
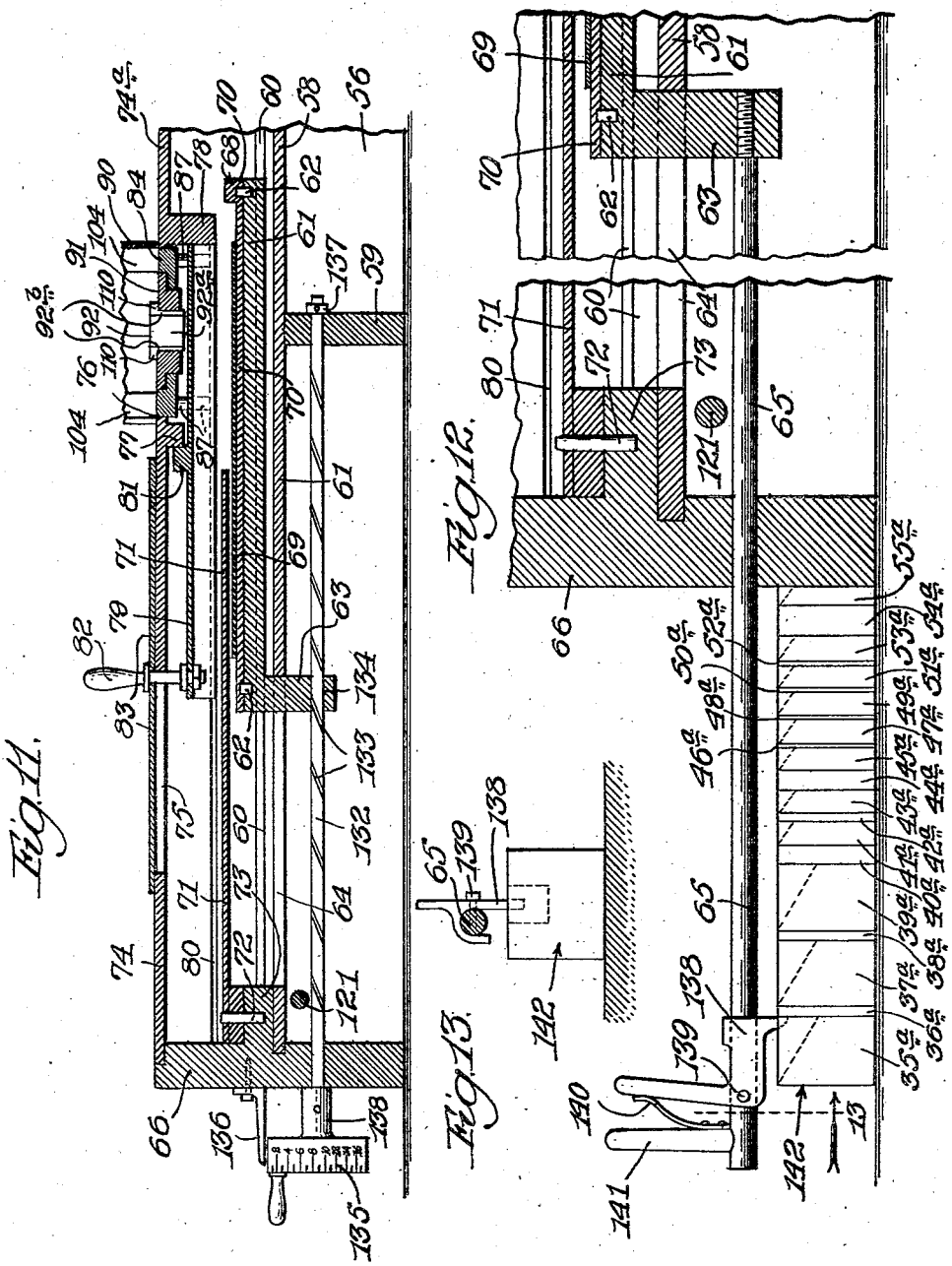
Inventor:
George L. Morrison,

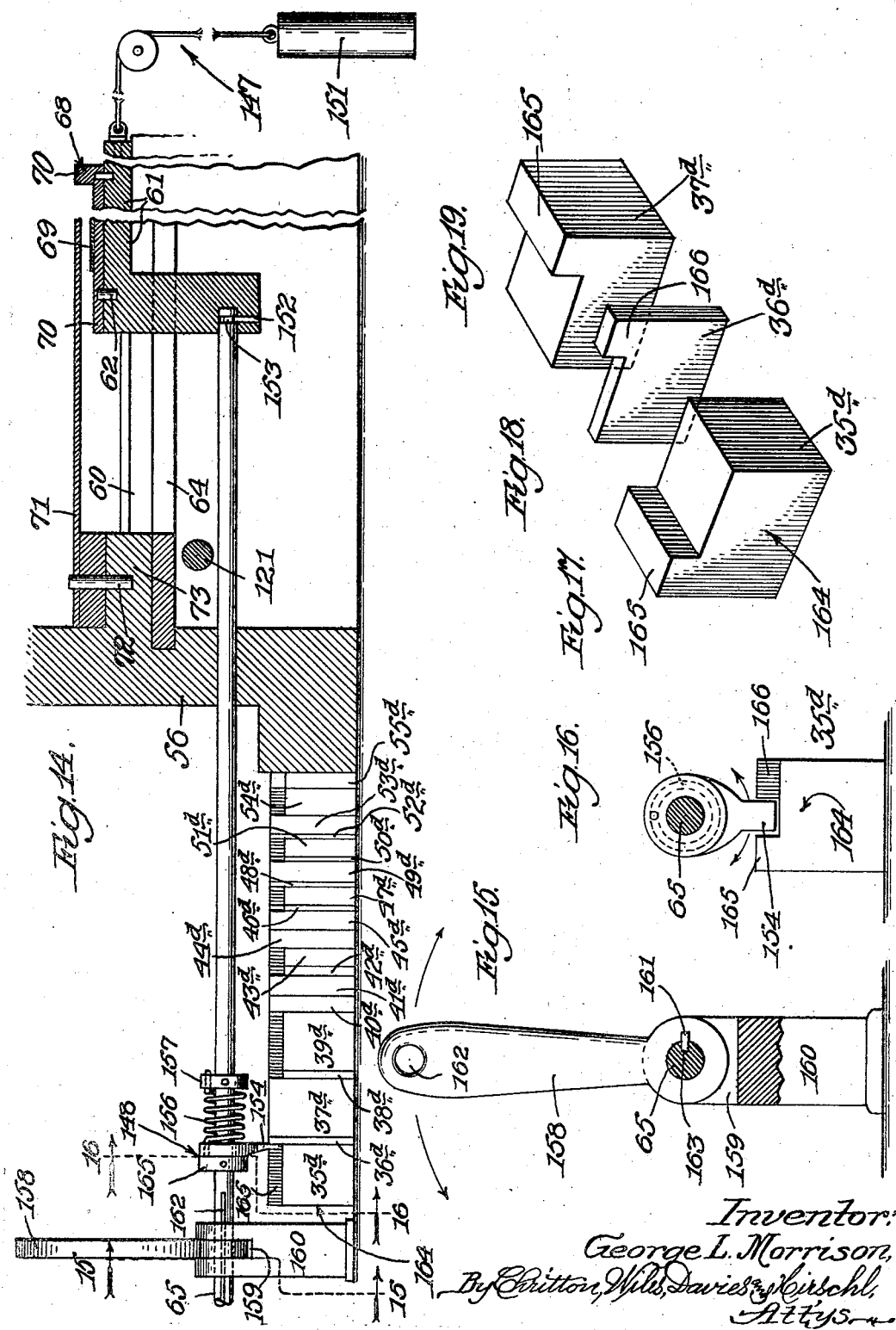

May 21, 1946.  G. L. MORRISON  2,400,567
METHOD OF AND MEANS FOR CALCULATING AND
CONTROLLING LINE PRINTING MACHINES
Filed March 30, 1942   8 Sheets-Sheet 7
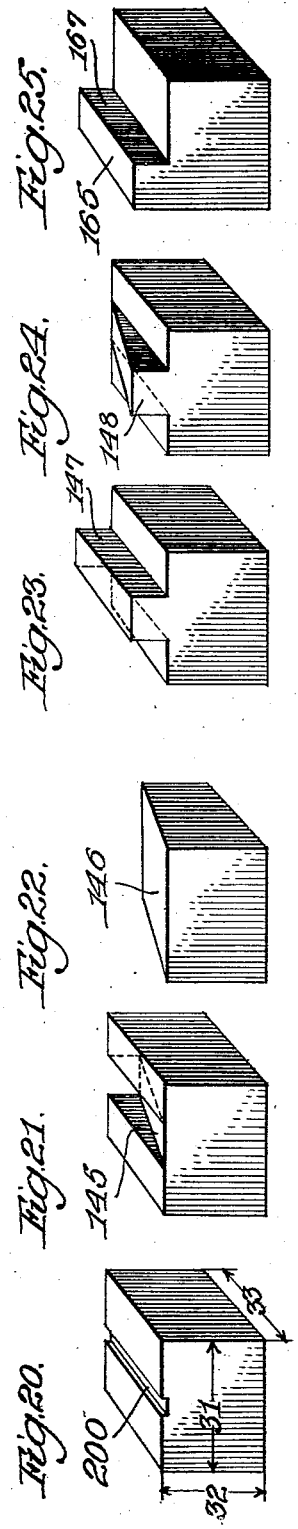
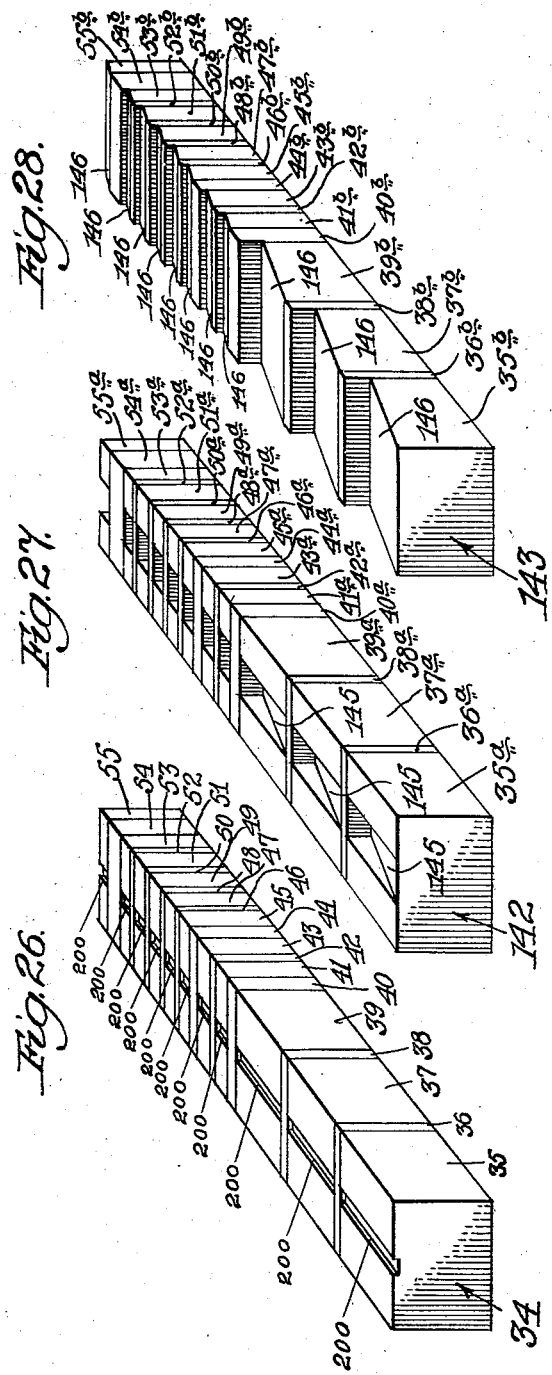
Inventor:
George L. Morrison,
By Critton, Wiles, Davies & Kirschl,
Attys

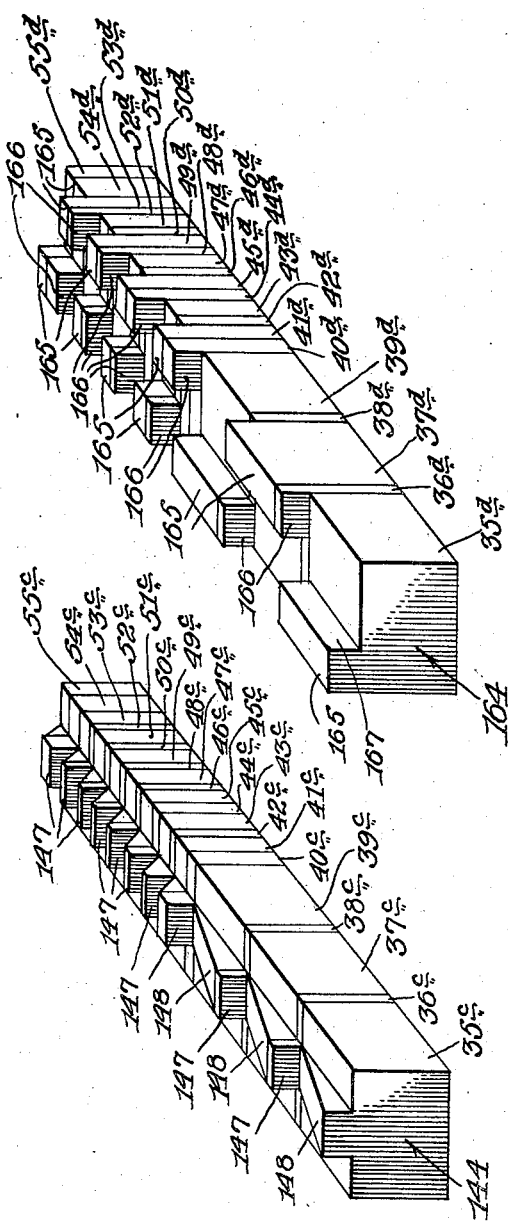

Patented May 21, 1946

2,400,567

UNITED STATES PATENT OFFICE 2,400,567

METHOD OF AND MEANS FOR CALCULATING AND CONTROLLING LINE PRINTING MACHINES

George L. Morrison, Evanston, Ill.

Application March 30, 1942, Serial No. 436,792

3 Claims. (Cl. 101—1)

This invention relates to the calculating of the makeup of a printed form by the use of blocks, and then using these blocks for the control of the indexing means of a line printing machine, whether the printing is ink printing or photoprinting.

Line printing machines can be in several forms, such as:

A machine for ink printing or photoprinting a line at a time from an assembled line, or lines, made up of, or equivalent to, type, linotype matrices or patrices.

A machine for ink printing or photoprinting a line at a time from a previously made line strip or strips.

A machine for ink printing or photoprinting a letter at a time to form a line, and then ink printing or photoprinting successive lines by the same method.

Machines of the character above set forth can print successive lines by moving the impressing means over the impressed means, or by moving the impressed means instead of the impressing means. In successive line printing such movable means cooperate with an indexing means.

The matter of indexing line printing machines of the character set forth, in which a particular size of type is ink printed or photoprinted in column form is a simple one. Due to uniformity of size and/or spacing, the movement from one line to another is uniform, and indexing is easily achieved by using the various alternatives of a ratchet operating on a spaced rack or wheel, or by means of a longitudinal screw or other spacing means in common use, such as lugs, pins, scales, etc. Means have also been provided in such machines for varying the uniform spacing of one column to a different uniform spacing of another column.

The problem of indexing a line printing machine capable of printing variable sizes of type with variable spacing between the lines presents problems of indexing that cannot be efficiently met with by said line spacing means as commonly known.

One of my objects is to provide for the efficient meeting of the conditions of variable size of type, whether ink printing or photoprinting type, and variable spacing of lines of type without any calculations other than the use of ordinary skills now prevalent in the typographic art, the skills referred to being those skills used in "the arrangement of composed types or the appearance of printed matter" commonly termed "makeup"; and other objects as will be manifest from the following description.

Referring to the accompanying drawings:

Figure 1 is a typical copy of the matter to be printed bearing specifications for the printer's information.

Figure 2 is a printed copy made from the copy of Fig. 1.

Figure 3 is a plan view of a column of blocks equivalent of type units and spacing units, respectively, interspersed.

Figure 4 is an isometric view of a line printing phototypographic machine constituting one embodiment of my invention and one of the many forms of structure by which my novel method may be practiced.

Figure 5 is a view in longitudinal sectional elevation of the machine of Fig. 4 showing the parts of the apparatus in normal position, the section being taken midway between opposite sides of the machine.

Figure 6 is a section taken at the irregular line 6—6 on Fig. 5 and viewed in the direction of the arrows.

Figure 7 is a plan view of the stick holder forming a part of the machine, showing a stick therein supporting a line of type bodies to be printed.

Figure 8 is a view like Fig. 5 of the machine therein shown, illustrating the parts in printing position, the section being taken at the line 8 on Fig. 9 and viewed in the direction of the arrow.

Figure 9 is a fragmentary plan sectional view, the section being taken at the line 9 on Fig. 8 and viewed in the direction of the arrow.

Figure 10 is a fragmentary sectional view, the section being taken at the line 10 on Fig. 9 and viewed in the direction of the arrow.

Figure 11 is a fragmentary view, in longitudinal sectional elevation, of another construction of machine embodying my invention and by which my novel method may be practiced.

Figure 12 is a view like Fig. 11 of still another construction of machine embodying my invention and by which my novel method may be practiced.

Figure 13 is a section taken at the line 13 on Fig. 12 and viewed in the direction of the arrow.

Figure 14 is a view like Fig. 12 of still another construction embodying my invention and by which my novel method may be practiced.

Figure 15 is an enlarged sectional view, the section being taken at the line 15 on Fig. 14 and viewed in the direction of the arrow.

Figure 16 is an enlarged sectional view, the section being taken at the line 16 on Fig. 14 and viewed in the direction of the arrow.

Figures 17, 18 and 19 are isometric views of certain of the stop-forming blocks of the column thereof which is used as indexing means in the machine of Figs. 14-16.

Figures 20-25 are isometric views of different forms of blocks which may be used as the indexing means in connection with the illustrated machines.

Figure 26 is an isometric view of a column of blocks, the blocks being of the form shown in Fig. 20, and usable as indexing means in connection with the machines of Figs. 4 to 11, inclusive.

Figure 27 is a similar view of a column of blocks, made up of blocks of the form shown in Figs. 20 and 21 and usable as indexing means in connection with the machine of Figs. 12 and 13.

Figure 28 is a similar view of a column of blocks made up of blocks of the forms shown in Figs. 20 and 22 and usable as indexing means with the machine of Figs. 12 and 13.

Figure 29 is a similar view of a column of blocks made up of blocks of the forms shown in Figs. 23 and 24 and usable as indexing means with the machine of Figs. 12 and 13; and Figure 30, a similar view of a column of blocks made up of blocks of the form shown in Figs. 17, 18, 19 and 25 and usable as indexing means with the machine of Figs. 14-16.

As a preface to the following description, reference is made to the illustrations in Figs. 1 and 2.

Figure 1 shows typical copy, shown as typewritten, to be ink printed or photoprinted and is supplied to the typographer with the necessary specifications noted thereon, viz., the outside dimensions of the form indicated, by way of example, as "15 picas wide x 22½ picas deep"; and the number of lines of type in each group thereof; and the point sizes and faces of such type to be used. In many cases in addition to such copy a pencil sketch or layout is furnished in order to visualize the arrangement of type and as a further aid to the typographer.

In accordance with the common practice of typesetting, the typesetter sets the type according to the specifications, and then spaces the various units involved until a pleasing appearance results, this being done by the proper spacing of the individual lines of type and by the proper spacing between the type lines.

When such makeup is proceeding there is very little calculation involved, although the various units used are accurate to fractions of a thousandth of an inch. Such a job very seldom comes out to a specified over-all depth without some unequal spacing being done, or a division of the inequality where it will not be noticed, it being a part of the skills involved to know how this should be done, so a pleasing appearance results.

As will be manifest an attempt to specify where each line should be placed within the degree of accuracy necessary to achieve the desired appearance presents a problem especially when inequalities of spacing must be taken care of in such calculations.

Fig. 2 shows a proof of the job produced from the copy shown in Fig. 1, as it would appear after the specifications given in Fig. 1 are carried out by ordinary typographic skill. The tabulation on Fig. 2 shows in point measurement in the first column the sizes of type used, and the second column the sizes of spacing material used between the lines to achieve the effect shown, as well as to make up the form to correct over-all depth specified.

In the case of a printing machine for printing a succession of lines of various sizes of type, as for example in accordance with the example shown in Fig. 2, it is necessary to print each line on a sheet or web in an exact and predetermined position, and to do so, indexing means by which the lines of printing, with the desired spacing of the lines, are produced on the sheet or web, must be provided.

As in the case of the common practice of typesetting, an attempt to specify where each line should be placed, within the degree of accuracy necessary to achieve the desired appearance, has presented problems involved in the creating of indexing means for line-printing machines, these problems being complicated especially where inequalities of spacing have to be taken into consideration in making such calculations.

In accordance with my invention I provide for the control of line positioning or spacing by means which involve no calculations of line positioning or line spacing other than the use of ordinary skills now prevalent in the typographic art, such means comprising blocks which are the equivalent of type and spacing units used in the art of typography. They can be of a size proportionate to the size to be printed or of the same size as the size to be printed. A preferable and handy size to be used would be that in which all of the blocks are 72 points wide at the dimension indicated at 31 (Fig. 20) and ¾ inch high at the dimension indicated at 32. The thickness of the blocks at the dimension indicated at 33 in Fig. 20 would be in the usual printers' standard of body measurement such as 2, 6, 8, 10, 12, 14, 18, 24, 30, 36, 42, 48, 60 and 72 points thick. Other sizes could of course be used.

An adequate supply of each point size of blocks would be used, and be kept in convenient cases. These blocks can be painted, nicked, inscribed or otherwise marked on the top or bottom surfaces to indicate their use as an equivalent for a line of type or the equivalent for a spacer and/or to indicate their point size. With the marked side up they could represent type lines, and with the marked side down they could represent spacing between the lines, where blocks of a uniform cross section are used such as shown in Figs. 20 and 26. Different heights or different constructions of blocks can also be used as an indication of their function as equivalents for type lines or spaces between lines. Many differentiations can be used, and it is important that some such means be used, for aid in visualizing the makeup and for use by the operator of the line printing machine where manual indexing is used.

It may be here noted that as the operations of creating an index from the specifications shown in Fig. 1 are the same as would be the case if a sketch or layout is made or if reprint copy is used, Fig. 1 may be used as a typical starting point for the creation of an index.

In carrying out the invention the operator selects the appropriate blocks to be used and assembles them into a column for use in connection with the printing machine for printing the desired copy. In the case of the use of the printing machine shown in Figs. 4 to 10, inclusive, for printing, by way of example, the copy shown in Fig. 2, the selected blocks would be assembled into the column represented at 34. The several blocks forming the column 34 are represented at 35 to 55, inclusive, the odd numbered blocks representing type lines equivalent to the type lines of Fig. 2 and being of the same point sizes as shown in the first column of the table in Fig. 2, and the even-numbered blocks of the column representing spacing blocks equivalent to the spacing material used between lines in Fig. 2 and being of the same point sizes as shown in the second column of the table in Fig. 2. In this particular arrangement the hereinbefore referred to marking of the blocks is shown in the form of nicks 200 in their upper surfaces and in assembling the blocks to form the column the odd-numbered blocks, representing type lines, are positioned with their nicked surfaces uppermost and the even-numbered blocks with their nicked surfaces lowermost; it being understood that the operator assembles the column 34 as the typographer assembles lines of type and spacing material to cause the makeup to be produced to present the desired appearance in accordance with common practice.

It is therefore easy for those skilled in the art of typography to take copy and specifications such as is shown in Fig. 1 and assemble the block sizes indicated in the specifications in the order indicated and assemble the blocks in consecutive order into a column, the blocks representing type lines being assembled in the particular example given with their nicked surfaces uppermost. Blocks representing the spacing material, with their nicked surfaces down, would then be dropped between the lines, such an operation being equivalent to ordinary makeup of a type form. The judgment and method are the same, only the blocks are assembled faster than a type form.

Such an operation would preferably be done by those that make decisions, as for instance the layout man or the foreman, as errors in layout are quickly seen and adjustments made accordingly before any further work is done. The ability to do this quickly and economically at this point is important for efficient work, but it can also be done by a skilled compositor specializing in layout, or by the line printing machine operator.

The different point size blocks are preferably arranged in a handy tray or case adjacent to the person who makes up the indexes. Shallow trays for holding a column of blocks can be provided or not as desired, for use both by the assembler and for use on the line printing machine.

Referring now to the machine shown in Figs. 4 to 10, inclusive, it comprises a stationary main housing 56 shown as mounted on a base 57, as for example the top of a table. The housing 56 contains a horizontal solid partition 58, braced between its ends by a strut 59 and is provided on its upper surface with horizontal guides 60 of V-shape in cross section extending lengthwise of the housing for the support of a slide 61 shown as having upwardly extending dowels 62. The slide 61 is provided with a depending lug 63 extending through a slot 64 in the partition 58 and connected with an indexing rod 65 slidable in an end wall 66 of the housing 56 and by means of which the slide 61 is moved along its supporting guides 60 under the control of the operator, the rod 65 having a handle 67 at its outer end by which to operate it, and a depending lug 65a.

The slide 61 is provided for the support of a holder 68 for the sensitized material to be printed, shown as in the form of a sheet 69, secured to the upper surface of the base 70 of the holder 68, the holder being releasably secured at its base 70 to the slide 61 by means of the dowels 62 on the slide. The cover of the holder 68 which when closed renders the holder light tight, is represented at 71 and is held against movement in the feeding of the holder 68 by a dowel 72 carried by a projection 73 on the end wall 66 of the housing 56 and forming a positioning stop for the holder 68 in the application of the holder to place in the housing 56.

The housing 56 has a removable and replaceable cover 74 with an opening 76 toward its mid-portion extending crosswise of the cover and a slot 75 towards one end extending lengthwise thereof, light-excluding stops 77 and 78 positioned transversely of the cover depending from the cover at opposite sides of the opening 76.

Below the cover 74 is a shutter 79 in the form of a plate guidingly supported at its opposite edges in grooves 80 in opposite sides walls of the housing 56 and adapted to form light-tight joints between its forward edge and the stop 78 and between a stop 81 on the shutter 79 and the stop 77 when the shutter is in closed position (Fig. 5).

The shutter 79 is operated by means of a handle 82 extending through the slot 75 in the cover 74, entrance of light into the housing through the slot 75 being prevented by a cover-plate 83 secured to the handle 82 and slidable therewith on the top of the cover.

Located in, and slidably filling, the opening 76 is a rectangular stick-holder 84, yieldingly supported as by means of springs 85, one only of which is shown, located in sockets 86 in opposite side walls of the housing 56 disposed in a rectangular arrangement beneath the corners of the stick-holder 84 and rods 87 depending from the stick-holder and supported on the springs 85.

Mounted on the housing 56 is a rectangular auxiliary housing 88 open at its bottom at which it registers with the opening 76, the auxiliary housing 88 having an opening 89 in its front wall 90, through which the stick shown at 91 and carrying the line of printing type bodies 92 by which the printing is to be effected, is insertable into the stick-holder 84, the type bodies illustrated being of the character disclosed in my pending application for United States Letters Patent Ser. No. 277,281, filed June 3, 1939, and thus in the form of laminated structures each composed of a central lamination 92$^a$ of light pervious material forming a light channel and presenting at its lower face the image to be photographed, represented as a negative but which may be a positive, and opaque laminations 92$^b$ flanking, and secured to, the lamination 92$^a$.

The stick 91 is shown as of a conventional form and involves a follower 93 engaged by a non-rotatable screw-rod 94 in the stick and a nut 95 threaded on the rod 94 and rotatable on the stick but held against lengthwise movement thereon, by which a line of type bodies may be clamped in the stick.

The opening 89 is controlled by a light-excluding shutter 96 on the interior of the auxiliary housing 88, slidable into and out of a position for closing the opening 89, the shutter 96 which has a flange 97 at its lower edge extending into the opening 89, being shown as guided in its movement by guide studs 98 secured to the front wall 90 of the housing 88 and extending into vertically elongated parallel slots in the shutter, one of these slots being shown at 99 (Fig. 10).

Vertically movable in the auxiliary housing 88 is a movable housing 100 open at its bottom and yieldingly supported by coil springs 101 secured at their upper ends to the top of the auxiliary housing 88 and at their lower ends to studs 102 on the movable housing 100.

The movable housing 100 is guided in its reciprocations by guide bars 103 thereon of dove-tail form in cross section confined in vertical dove-tail grooves 104 on the inner surfaces of the end walls of the auxiliary housing 88 (Fig. 9).

The movable housing 100 is provided as a support and cover for the light source, shown as an electric lamp 105 preferably of the gaseous type, by which the printing is to be effected, and also as a means for clamping the type bodies 92 against the sensitized material 69 during the printing operation.

In the arrangement shown the lamp 105 is represented as mounted in lamp sockets 106 carried by the movable housing 100 and current is supplied to the lamp from any suitable source of current supplied to the sockets 106 under the control of a switch such as shown at 107.

To perform the above referred-to operation of clamping the type bodies against the sensitized material 69, the movable housing 100 is provided internally at its lower open end with bars 108 spaced apart to provide a light-channel between them and having spaced apart flanges 109 extending lengthwise thereof adapted to bear downwardly against the ears 110 on the type bodies when the housing 100 is lowered as hereinafter explained.

The movable housing 100, in its movements, controls the movement of the shutter 96 to open and closed position. This is effected by providing cooperating over-lapping stops 111 and 112 on the housing 100 and shutter 96, respectively. The shutter 96 is gravity-operated to closed light-sealing position in the lowering of the movable housing 100 and is raised by means of the cooperating lugs 111 and 112 to open position in the raising of this housing.

It may be stated that the parts described are so constructed and arranged that in the position shown in Fig. 5, in which the opening 76 is closed by the shutter 79 obstructing the passage of light through this opening to the interior of the main housing 56, the stick holder 84, shutter 96, and movable housing 100 are in their uppermost positions; and that in the downward movement of the housing 100 the shutter 96, moving downwardly by gravity, closes the opening 89 before the clamp-bars 108 engage the type bodies 92 preliminary to forcing them against the sensitized material 69 in which movement the stick 91 and holder 84 are depressed. Thus the shutter 79 may be slid from the position shown in which it would obstruct downward movement of the holder 84 and the parts carried thereby.

Means are provided for effecting the above-referred-to partial and full movements of the movable housing 100 as desired, the means shown for this purpose comprising lugs 113 and 114 extending laterally from the movable housing 100, through slots 115 and 116 in the auxiliary housing 88; cables 117 and 118 connected with the lugs 113 and 114 and trained over idler sheaves 119 and 120 journaled on the main housing 56; sheaves attached to the ends of a shaft 121 journaled in the main housing 56 and to which the cables 117 and 118 are connected, respectively, one of the last-referred-to sheaves being represented at 122; an operating lever 123 fixed to the shaft 121; stop-pins 124 and 125 on the main housing 56 engageable by the operating lever 123 in its movements in opposite directions for controlling the extent of movement of the lever 123; a positioning plate 126 attached to the operating sheave 122, this plate having notches 127 and 128 in its periphery; and a plunger device 129 cooperating with the plate 126 and comprising a plunger 130 slidable in a casing 131 secured to the main housing 56 and backed by a spring (not shown) in the casing 131, which yieldingly forces the plunger 130 against the periphery of the positioning plate 126.

In the normal position of the parts as shown in Figs. 4, 5 and 6 the operating lever 123 is in engagement with the stop 124 in which position the shutter 96, movable housing 100, and stick-holder 84 are in their uppermost positions. Operating the lever 123 to a position in which the notch 127 in the positioning plate 126 is engaged by the spring plunger 130 lowers the movable housing 100 part way, sufficiently to permit the shutter 96 to close the opening 89, but not far enough to depress the line of type bodies 92, the plunger 130 holding the parts in this position. Further operating the lever 123 to engage the stop 125, preliminary to which the operator retracts the shutter 79, in which position of the lever 123 the plunger 130 engages the notch 128, causes the movable housing 100 to clamp the line of type bodies 92 against the sensitized material 69 as shown in Figs. 8 and 9.

Reversely operating the lever 123 toward the stop 124 to disengage the plunger 130 from the notch 128 and to engage the notch 127 with this plunger, permits the stick-holder 84 to rise to normal position, the shutter 96 remaining closed (in which position of the parts the operator restores the shutter 79 to closed position), and operating the lever 123 to disengage the plunger 130 from the notch 127 and engage this lever with the stop 124 permits the housing 100 and shutter 96 to rise to normal position in which the shutter 96 is open.

The operation of the machine is as follows:

The operator applies the column 34 of blocks to the base 57 (Fig. 4) to abut a stop block 56a on the main housing 56 and extend lengthwise beneath the indexing slide rod 65.

He then removes the cover 74 and moves the slide 61 to engage the lug 63 on the slide with the stop 73 on the end wall 66 and inserts the sensitized material-holder 68 into the housing 56 into engagement at its base 70 with the dowels 62 on the slide 61 in housing 56 and into engagement at its cover 71 with the dowel 72. The cover 74 is then replaced and the shutter 79 slid to closed position (Fig. 5) assuming the lever 123 to be engaged with the stop 124 (Fig. 4) in which position the stick-holder 84 is in its uppermost position.

The composing stick 91 is then removed from the holder 84 and through the opening 89 and the first line of type bodies 92 to be printed is composed in the stick and the stick with its line of type bodies then inserted to place in the holder 84.

The operator then removes from the column 34 the block 35, representing the first line to be printed, and pushes the indexing rod 65 rearwardly to press the lug 65a thereon against the block 36. In this movement of the rod 65 and slide 61, together with the holder-base 70 and the sensitized material 69 are moved relative to the stationarily held cover 71, of the holder 68, thus uncovering the part of the sensitized material 69 which is to receive the first line impression.

The operator then operates the lever 123 away from the stop 124 to the position controlled by the notch 127 in the positioning plate 126 in which operation the shutter 96 closes, the operating lever 123 being held in this position by the plunger 130. The operator then withdraws the shutter 79 to open position and thereupon further operates the lever 123 into engagement with the stop 125, in which position the plunger 130 engages the notch 128, thereby causing the movable housing 100 to engage the line of type bodies 92 and force them, against the resistance of the holder-supporting springs 85, into contact with the sensitized material 69. The lamp 105 is then energized for the proper length of time by operating the switch 107, to photoprint the first line of the impressions. Preferably the switch 107 would be associated with any suitable timing means as will be understood by those skilled in the art, for automatically timing the flow of current to the lamp.

After the exposure the operating lever 123 is moved to the position controlled by the notch 127 in which movement the stick-holder 84 moves to normal raised position. The shutter 79 is then moved to closed position and the lever 123 further operated to engage the stop 124 in which movement the shutter 96 and movable housing 100 move to normal position (Fig. 5) in which the opening 76 is uncovered.

The stick 91 with the line of type bodies therein is then removed from the holder 84 through the opening 89 and the type bodies distributed in the case forming the supply of type bodies to be used.

The same sequence of operations as above described, excluding those involved in the loading of the sensitized material into the machine, are followed for the printing of the next line of the impressions; the positioning of the sensitized material 69 for the printing of this line being effected by the operator removing the spacing block 36 and the type line block 37 and then moving the indexing rod 65, rearwardly to abut its lug 65a against the spacing block 38.

The second line of type bodies is set in the stick 91 and the stick replaced in the holder 84; the operating lever 123 is then actuated to move the shutter 90 to closed position; the shutter 79 is then moved to open position and the line of type bodies 92 forced against the sensitized material 69 by further operating the operating lever 123. The lamp 105 is then energized to print the line; the operating lever 123 is then operated to permit the holder 84 to rise while maintaining the shutter 96 closed; the shutter 79 is then closed and the shutter 96 and movable housing 100 raised by the operating lever 123, to normal position in which the shutter 96 is open.

The printing of the third line is effected by the same sequence of operations after blocks 38 and 39 are removed from the column 34 and the indexing rod 65 moved rearwardly to abut its lug 65a against the block 40.

The above sequence of operations applies to the printing of each subsequent line until the job is completed, it being understood that each line position of the sensitized material is controlled by the corresponding line block in the column of blocks.

It will be understood that as regards the matter of shielding the sensitized material 69 from becoming light-struck, no particular sequence of the operations of the shutter 79 and the feed of the slide 61 under the control of the column 34 of blocks, need be observed, except that the shutter 79 must be closed whenever the shutter 96 is open.

Referring to the construction shown in Fig. 11, this construction is the same as that of Figs. 1–10, inclusive, except for the modification thereof to incorporate therein micrometer means for effecting the desired successive positioning of the sensitized material relative to the impressing means, such of the parts as are common to both machines being designated by the same numerals.

Instead of employing the slide rod 65 and column 34 of blocks determining the adjustments of the slide rod as in Figs. 1–10, an indexing rod 132 having a thread 133 screwing in a threaded opening 134 in the lug 63 on the slide 61 and journaled in the end wall 66 of the housing 56, is provided. The rod 132 has fixed to its outer end a micrometer dial 135 cooperating with a pointer 136 on the end wall 66, the rod 132 being held against endwise movement by a collar 137 on one end and a hub 138 on the dial 135 at the other end.

The dial 135 can be graduated in thousandths or, preferably, in points. More accurate indexing can be attained with this construction than by the use of a straight scale and pointer so it is shown in connection with a line printing machine as being an alternative method of using an indexing block method. In order to use such a means of indexing to achieve the same results as heretofore described, it is necessary for efficient operation to assemble a column of blocks and make them up in the manner heretofore described thus obtaining the indexing information in the simplest manner. After the column is assembled the data represented by the column can be transferred to the micrometer means by means of a transcribed record showing how much to move the micrometer dial 135, or if the sizes of each block were placed on each block the dial could be moved the amount indicated by each block in consecutive order.

Thus to index the first line to be printed in the example given in Fig. 2 the micrometer dial would be moved 36 points on the scale corresponding with the thickness of the block 35 of column 34. The second line would require a movement of 6 points corresponding with block 36 and 36 points corresponding with block 37. The third line would require a movement of 6 points corresponding with block 38 and 36 points corresponding with block 39. Each block would require the movement of the dial 135 indicated in the tabulation on Fig. 2.

The construction shown in Figs. 12 and 13 illustrates a utilization of my invention where the block-column idea is employed in a printing machine of the ratchet-indexing type. This construction is the same as that shown in Figs. 4–10, inclusive, (the parts common to both constructions being designated by the same characters) except there is substituted for the lug 65a of Figs. 4–10, a ratchet 138 pivoted at 139 to the slide bar 65 for cooperation with a column of indexing blocks forming, in effect, a rack, and serving as a guide for the successive positionings of the sensitized sheet holder 68, a spring 140 secured to a handle 141 on the rod 65 and bearing against the ratchet 138 serving to releasably hold the ratchet in engagement with said rack. In this construction, as will be understood, none of the blocks of the block column would be removed after each indexing position is attained, the ratchet 138 being moved directly from one indexing position to the next.

The indexing blocks forming the column for use with this construction of machine would be the same as those above described for making up the previously described block column 34, except that they are provided of such forms as to provide a rack when assembled into a column, with which the ratchet 138 is to cooperate. Figs. 27, 28 and 29 show at 142, 143, and 144, respectively, different columns of blocks which, by way of example, are suitable for use with such ratchet means.

The columns 142, 143 and 144, are shown as composed of blocks of the sizes and representing lines of type and spacing material as in the case of the column 34, for use in the printing of a copy like that of Fig. 2, the blocks of these several columns being numbered serially as in the case of the column 34 of Fig. 26, except letter exponents a, b and c, different for the several columns 142, 143 and 144, respectively, are added thereto.

In the case of the column 142 of Fig. 27 the odd-numbered blocks (a typical one of which is shown in Fig. 21) have angular cuts 145 in their upper surfaces to expose, for cooperation with the ratchet 138, the upper edge portions of the even-numbered blocks representing spacing material, such as shown in Fig. 20.

In the case of the column 143 of Fig. 28 the odd-numbered blocks (a typical one of which is shown in Fig. 22) have angular cuts 146 in their upper surfaces like those of the odd-numbered blocks of Fig. 27, but such cuts extend entirely across the tops of the blocks.

In the case of the column 144 of Fig. 29 the even-numbered blocks (a typical one of which is shown in Fig. 23) are provided with centralized upwardly extending projections 147, and the odd-numbered blocks (a typical one of which is shown in Fig. 24) are provided with centralized upwardly extending projections 148 the upper surfaces of which slope downwardly in a rearward direction to expose for cooperation with the ratchet 138, the upper edge portions of the even-numbered blocks representing spacing material.

As shown in Fig. 12 the column of blocks, such by way of example, as any one of the columns 142, 143 and 144, the particular column shown being 142, is applied to position beneath the slide rod 65 to abut at one end against the end wall 66 of the housing 56.

The illustrated position of the ratchet 138, viz., against the block 36ª represents the position of the parts of the machine for making the first line impression. To position the parts for the making of the second line impression the ratchet 138 would be lifted clear of the column 142 of blocks and the slide-rod 65 pushed rearwardly to a position in which the ratchet engages the block 38ª, the remaining even-numbered blocks serving as means for determining the positioning of the ratchet 138 and slide rod 65 for the making of the remaining line impressions.

Figs. 14–16, inclusive, illustrate a construction of machine employing automatic or semi-automatic means using indexing blocks for variable indexing in accordance with my invention.

This machine is of the same construction as that shown in Figs. 4–10, inclusive, (the parts common to both constructions being designated by the same characters), except that means are provided, as represented generally at 147, to exert constant tensioning on the sensitized sheet holder 68 to move it to the right in Fig. 14; the lug 65ª of Figs. 4–10 is omitted; the slide-rod 65 is rotatably, as well as slidingly, mounted and stop and escapement means represented generally at 148, are provided to effect the desired intermittent variable movement of the sensitized sheet holder 68 under the control of a column of blocks.

The tensioning means 147 may be of any desirable construction, such as for example gravity-actuated means, spring means or pneumatic or hydraulic means. The form of means shown is of the gravity type and comprises a flexible element 149, as for example a cable, secured at one end to the slide 61, extending between its ends over a pulley 150 mounted on a support (not shown) and carrying at its other, depending end, a weight 151 operating to produce the desired constant tension on the slide 61.

The connection between the slide-rod 65, rotatable in this construction, and the lug 63 on slide 61 comprises a pin 152 mounted in the lug 63 and projecting into an annular groove 153 in the slide-rod 65, adapting the slide-rod to rotate.

The stop and escapement means 148 comprises an escapement finger 154 rotatable on the slide-rod 65 and abutting a collar 155 secured to this rod; a torsion spring 156 surrounding the rod 65 between the escapement finger 154 and a collar 157 secured to the rod 65, the spring 156 being connected at its opposite ends with the finger 154 and collar 157, respectively; and means for rotating the rod 65 in opposite directions.

The rod-rotating means comprise an operating arm 158 extending into the fork 159 of a support 160 in which the forward end of the slide-rod 65 is journaled and slidable, the arm 158 being rigidly connected with the slide-rod 65 as by means of a feather 161 on the arm 158 located in a groove 162 in the rod 65 and extending lengthwise of the latter.

The operating arm 158, which thus has oscillating movement for reversely rotating the slide rod 65 may be operated by hand or, if desired, by any suitable automatically operating means, as for example through the medium of an arm (not shown) connected with the operating arm 158 at 162, to effect the desired timing of the operation of the arm 158.

A column of blocks to be used for indexing the machine is illustrated at 164, it being shown, by way of example, as composed of blocks of the sizes and representing lines of type and spacing material as in the case of the column 34, for use in the printing of the copy shown in Fig. 2, the blocks of the column 164 being numbered serially as in the case of the column 34, except each number bears the letter d exponent.

The blocks 35ᵈ to 55ᵈ, inclusive, differ from the blocks 35 to 55 of column 34 in that each block is provided with an upwardly extending projection of less than one-half the width of the block and extending the full thickness of the block at a side portion of the block, the projections on the odd-numbered blocks being designated at 165, and those on the even-numbered blocks at 166, the projections 165 on adjacent ones of the odd-numbered blocks and the projections 166 on adjacent ones of the even-numbered blocks being arranged in staggered relation at opposite sides of the blocks as illustrated in Fig. 30.

As shown in Fig. 14 the column 164 of blocks is applied to position beneath the slide-rod 65 to abut at one end against the stop block 56a, and the slide rod 65 is drawn forwardly against the resistance of the weight 151 and rotated to cause the escapement finger 154 to become positioned against the projection 166 on block 36d as shown in Fig. 14 which indexes the machine for the printing of the first type line.

To index the machine for the printing of the second type line the arm 158 is swung to the right in Fig. 16 for swinging the escapement finger 154 to the left in this figure, into contact with the inner side surface 167 of the projection 165 of block 35ᵈ which engagement prevents further swinging of the escapement finger 154 in this direction. Because of the torsion-spring connection of the escapement finger 154 with the slide rod 65, as above described, continuing force applied to the operating arm swinging it to the right in Fig. 16 with consequent rotation of the slide-rod 65, independently of the escapement finger 154, causes the spring 156 to become tensioned. As the tensioning means 147 exert a constant pull on the slide 61 and rod 65, and consequently the escapement finger 154, these means operate to cause the escapement finger to slip off the block 35ᵈ and move, with the rod 65, rearwardly and, under the action of the energy stored in the spring 156 in the tensioning thereof as above described, become positioned against the projection 166 on block 38ᵈ, which is the indexing position for impressing the second type line in the proper position.

When the third type line is to be indexed the escapement finger 154 is swung to the right in Fig. 16 until it strikes the inner side of the projection 165 of block 37ᵈ excess movement of the operating arm 158 causing the spring 156 to become tensioned, as described above, the escapement finger becoming positioned against the projection 166 of block 40ᵈ by the combined action of the energy stored in the spring 156 and the pull exerted by the constant tensioning means 147. The indexing for the remainder of the type lines to be impressed, is accomplished by repeating the cycle of operations above described, by continuing the oscillations of the operating arm 158 at the properly timed intervals.

As will be understood, the principles illustrated in connection with the machine last described may be applied to any automatic line printing machine to give the desired variable line spacing.

The makeup of the particular illustrated columns of blocks shown in Figs. 26–30, inclusive, involves blocks representing both type lines and spacing material such as would be used where the form of Fig. 2, requiring spacing of the type lines, is to be printed. It will be understood, however, that where the form to be printed is to be printed "solid" throughout or as to certain groups only of adjacent lines, in which cases there would be no spacing of the blocks representing type lines at such "solid" portion or portions, blocks representing spacing material would be omitted from the column at such portion or portions and the indexing would be effected from the face of one type line block to the face of the next type line block instead of from one spacing block to the next spacing block as in the particular columns shown in the drawings.

While I have illustrated and described certain embodiments of my invention I do not wish to be understood as intending to limit it thereto as the same may be variously modified and altered and the invention embodied in other forms of structure without departing from the spirit of my invention. Furthermore, while I have illustrated and described certain particular ways of practicing my improved method and certain structures by which it may be practiced I do not wish to be understood as intending to limit it thereto as it may be practiced in other ways and by other apparatus without departing from the spirit of the invention.

What I claim as new and desire to secure by Letters Patent, is:

1. In a line printing machine wherein the impressing means and object to be impressed are relatively movable to print a succession of lines, a rotatable and longitudinally movable member by which the relative positioning of said means and object is effected, means urging said member lengthwise in one direction, a rack formed of blocks assembled into column form for the purpose of determining makeup and having projections arranged in series spaced apart crosswise of the column and an escapement device controlling the lengthwise movement of said member by said means movable into engagement with the projections of said series, alternately.

2. The process of determining column makeup and line printing in accordance therewith which comprises combining a variety of font high elements interspersed with a variety of line spacing elements to predetermine a desirable makeup filling a column; and utilizing the thus assembled elements to determine the fonts to be used and to locate an impression of the corresponding font forms at the predetermined intervals.

3. As accessory to a line printing machine comprising means movable to impress a succession of complete lines under control of a pawl; fonts of spacing blocks corresponding in thickness with the heights of various fonts of type; each block formed with pawl coacting ratchet like means at one end thereof and a plurality of line spacing blocks of varying thickness having their height and upper ends formed to coact in the pawl coacting function of the blocks of said fonts of spacing blocks; whereby assemblage of certain blocks chosen from said fonts in combination with chosen line spacing blocks enables preinspection of a makeup, and said assemblage may be used to coact with said pawl means to reproduce the makeup in print.

GEORGE L. MORRISON.